(12) United States Patent
Kee

(10) Patent No.: US 8,331,274 B2
(45) Date of Patent: Dec. 11, 2012

(54) WAKING UP A VOIP TERMINAL DEVICE FROM A POWER-SAVING STATE

(75) Inventor: Tommy Wing Chau Kee, Richmond (CA)

(73) Assignee: Broadcom Corporation, Irvine, CA (US)

( * ) Notice: Subject to any disclaimer, the term of this patent is extended or adjusted under 35 U.S.C. 154(b) by 1005 days.

(21) Appl. No.: 12/352,014

(22) Filed: Jan. 12, 2009

(65) Prior Publication Data

US 2010/0177765 A1 Jul. 15, 2010

(51) Int. Cl.
*G08C 17/00* (2006.01)
(52) U.S. Cl. ........................... 370/311; 455/343.1
(58) Field of Classification Search .................. 370/311; 455/436.1
See application file for complete search history.

(56) References Cited

U.S. PATENT DOCUMENTS

| | | | | |
|---|---|---|---|---|
| 2007/0004374 | A1* | 1/2007 | Kneckt | 455/343.1 |
| 2007/0183407 | A1* | 8/2007 | Bennett et al. | 370/352 |
| 2009/0135751 | A1* | 5/2009 | Hodges et al. | 370/311 |
| 2010/0023788 | A1* | 1/2010 | Scott et al. | 713/320 |
| 2010/0039971 | A1* | 2/2010 | Lor et al. | 370/311 |
| 2010/0158525 | A1* | 6/2010 | Walter | 398/71 |

* cited by examiner

*Primary Examiner* — Albert T Chou
(74) *Attorney, Agent, or Firm* — Fiala & Weaver P.L.L.C.

(57) ABSTRACT

A VoIP terminal device is configured to enter a power-saving state upon the occurrence of a specified condition. The VoIP terminal device is further configured to wake up from the power-saving state when a communication associated with a specified communication operation is received by the VoIP terminal device. In particular, the operating power of the VoIP terminal device is increased to an extent sufficient to perform the specified communication operation.

25 Claims, 6 Drawing Sheets

WAKING UP A VOIP TERMINAL DEVICE FROM A POWER-SAVING STATE

BACKGROUND OF THE INVENTION

1. Field of the Invention

The present invention generally relates to Voice over Internet Protocol (VoIP). In particular, the present invention is related to waking up a VoIP terminal device from a power-saving state.

2. Background Art

Voice over Internet Protocol (VoIP) enables the transfer of voice communications over a packet-switched data network, such as the Internet. Each communication is divided among a plurality of packets (i.e., datagrams) including respective encapsulated portions of the communication. The packets are transferred in a packet stream using Internet Protocol (IP).

Devices that support VoIP communications may be referred to as VoIP terminal devices. A VoIP terminal device may be a dedicated VoIP telephone or personal digital assistant (PDA), for example, which is capable of initiating and receiving telephone calls without the use of a computer. For instance, a dedicated VoIP telephone may be a push-to-talk phone, a one-end phone which is capable of receiving but not making calls, a telephone that is capable of receiving and making calls, etc. In another example, the VoIP device may be a computer having software installed thereon that enables the computer to initiate and/or receive telephone calls. In yet another example, the VoIP terminal device may be a VoIP adapter, which enables communication between a plain old telephone service (POTS) telephone and other VoIP terminal devices in a packet-switched network.

The performance characteristics of VoIP terminal devices differ from those of POTS telephones. For example, a POTS telephone maintains a relatively low power state unless the POTS telephone is ringing. Thus, the operating power (i.e., power consumption) of a POTS telephone is substantially negligible unless the POTS telephone is receiving a call. Conventional VoIP terminal devices, on the other hand, remain in a relatively high (i.e., standard) power state at all times because placing a conventional VoIP terminal device in a relatively low power state (i.e., a power-saving state) substantially compromises its ability to process packets that are used for signaling and user information transfer. For instance, placing a conventional VoIP terminal device in a power-saving state substantially hinders its ability to process packets that are necessary for waking up the VoIP terminal device from the power-saving state.

Thus, systems, methods, and computer program products are needed that enable VoIP terminal devices to wake up from a power-saving state.

BRIEF SUMMARY OF THE INVENTION

Systems, methods, and computer program products are described herein for placing a VoIP terminal device in a power-saving state and for waking up the VoIP terminal device from the power-saving state. For instance, the VoIP terminal device may be placed in the power-saving state based on a user action, inactivity of the VoIP terminal device, or proximity of the user to the VoIP terminal device. The VoIP terminal device may be configured to wake up from the power-saving state (i.e., increase its operating power to an extent sufficient to enable the VoIP terminal device to process content packets of an incoming communication) in response to determining that identification packet(s) of the incoming communication match reference packet(s) corresponding to a specified communication operation.

By enabling VoIP terminal devices to enter into and wake up from a power-saving state, embodiments of the present invention can advantageously conserve energy, reduce the operation cost and/or extend the battery life of the VoIP terminal devices, etc.

In particular, a method is described in which at least one identification packet of an incoming communication received by a VoIP terminal device operating in a power-saving state is compared to at least one reference packet corresponding to a specified communication operation. A determination is made that the at least one identification packet and the at least one reference packet match. An operating power of the VoIP terminal device is increased to an extent sufficient to enable the VoIP terminal device to process content packets of the incoming communication.

A computer program product is also described herein. The computer program product includes a computer-readable medium having computer program logic recorded thereon for enabling a processor-based system to wake up a VoIP terminal device. The computer program logic includes first and second program logic modules. The first program logic module is for comparing at least one identification packet of an incoming communication received by the VoIP terminal device operating in the power-saving state to at least one reference packet corresponding to a specified communication operation to determine that the at least one identification packet and the at least one reference packet match. The second program logic module is for increasing an operating power of the VoIP terminal device to an extent sufficient to enable the VoIP terminal device to process content packets of the incoming communication.

A system is also described. The system includes a packet matching module and a power management module. The packet matching module is configured to compare at least one identification packet of an incoming communication received by a VoIP terminal device operating in a power-saving state to at least one reference packet corresponding to a specified communication operation to determine that the at least one identification packet and the at least one reference packet match. The power management module is configured to increase an operating power of the VoIP terminal device to an extent sufficient to enable the VoIP terminal device to process content packets of the incoming communication.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIGS. 1, 3, and 5 show block diagrams of example VoIP terminal devices according to embodiments of the present invention.

Figure 1:
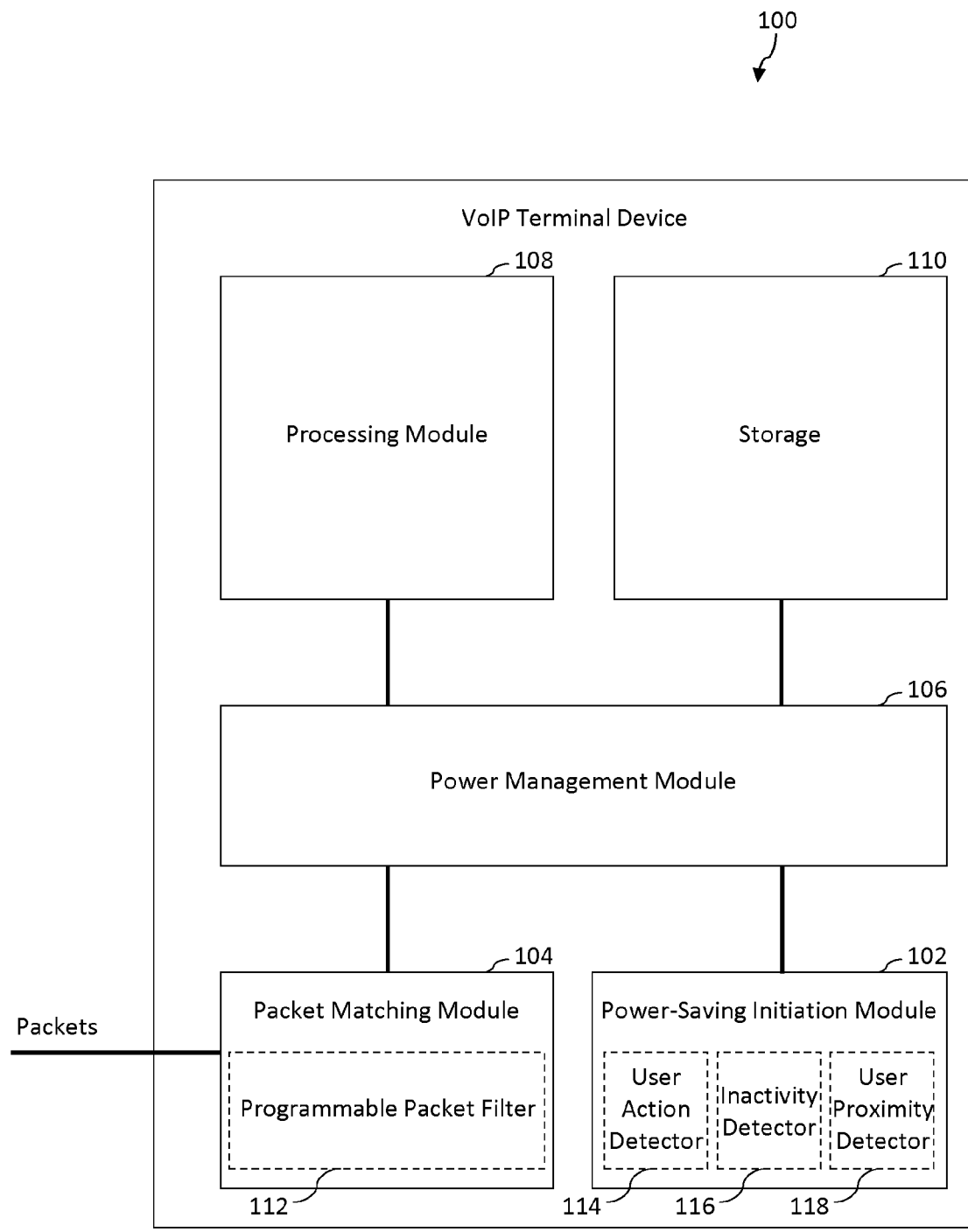

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Wake Up Techniques

Embodiments of the present invention enable VoIP terminal devices to enter a power-saving state and to wake up from the power-saving state. The wake up operation may be initiated locally (e.g., by initiating an outgoing communication, pressing a button on the VoIP terminal device, lifting a handset of the VoIP terminal device, etc.) or remotely (e.g., by receiving an incoming communication). When the wake up operation is initiated remotely, the VoIP terminal device increases its operating power to an extent sufficient to enable the VoIP terminal device to process content packets of an incoming communication in response to determining that identification packet(s) of the incoming communication match reference packet(s) corresponding to a specified communication operation.

FIG. 1 shows a block diagram of an example VoIP terminal device 100 according to an embodiment of the present invention. As shown in FIG. 1, VoIP terminal device 100 includes a power-saving initiation module 102, a packet matching module 104, a power management module 106, a processing module 108, and storage 110. Power-saving initiation module 102 is configured to determine when VoIP terminal device 100 is to enter a power-saving state in which one or more elements of VoIP terminal device 100 other than packet matching module 104 operate at a relatively low power (i.e., less than a standard power) or are turned off. For example, a determination to enter the power-saving state may be indicative of an expectation that fewer than all of the element(s) are going to be used or that the full capabilities of the element(s) may not be needed.

Power-saving initiation module 102 monitors VoIP terminal device 100 for a specified condition (e.g., user action, inactivity, user proximity, etc.). Upon detecting the specified condition, power-saving initiation module 102 provides a command to power management module 106 to place VoIP terminal device 100 in the power-saving state. Power management module 106 is configured to reduce the operating power of VoIP terminal device 100 to the appropriate level upon receipt of a command from power-saving initiation module 102 to enter the power-saving state.

The determination by power-saving initiation module 102 to initiate the power-saving state may be based on any of a variety of specified conditions or a combination thereof. For example, power-saving initiation module 102 is shown in FIG. 1 to include a user action detector 114, an inactivity detector 116, and a user proximity detector 118 for detecting respective specified conditions. Persons skilled in the relevant art(s) will recognize that detectors 114, 116, and 118 are provided for illustrative purposes and are not intended to be limiting. Power-saving initiation module 102 need not necessarily include detectors 114, 116, and 118 and may include other types of detectors.

User action detector 114 is configured to detect a user action, such as the pressing of a button on VoIP terminal device 100 or a change of physical configuration of VoIP terminal device 100. The button on VoIP terminal device 100 may be a physical button located on a keypad or keyboard of the VoIP terminal device 100 or a virtual button presented on a display of VoIP terminal device 100. Changing the physical configuration of VoIP terminal device 100 may include closing VoIP terminal device having a flip-phone configuration or a slide-phone configuration, for example. Power-saving initiation module 102 is configured to provide the command to enter the power-saving state in response to user action detector 114 detecting the user action.

Inactivity detector 116 is configured to detect inactivity of VoIP terminal device 100. For instance, inactivity detector 116 may include a timer that begins counting when the user completes a communication operation using VoIP terminal device 100. Inactivity detector 116 may determine that VoIP terminal device 100 is inactive in response to the timer reaching a specified number. Power-saving initiation module 102 is configured to provide the command to enter the power-saving state to power management module 106 in response to inactivity detector 116 detecting inactivity of VoIP terminal device 100.

User proximity detector 118 is configured to detect the proximity of the user to VoIP terminal device 100. For example, power-saving initiation module 102 may be configured to provide the command to enter the power-saving state to power management module 106 in response to user proximity detector 118 determining that the user moves beyond a specified proximity of VoIP terminal device 100.

VoIP terminal device 100 may be configured to operate in accordance with a short-range communication protocol, such as a near field magnetic induction communication (NFMIC) protocol, a radio frequency identification (RFID) protocol, a Bluetooth protocol, etc. User proximity detector 118 may include a first element (e.g., a transmitter coil, an RFID reader, a first transceiver microchip, etc.) that is in communication with a second element (e.g., a receiver coil, an RFID tag, a second transceiver microchip, etc.), which is in the possession of the user. The first element may be configured to transmit a detection signal. If the second element is within a specified proximity of the first element, as determined by the capabilities of the short-range communication protocol being used, the second element provides a response signal, which the first element is configured to detect. If, however, the second element is beyond the specified proximity, communication between the first and second elements is compromised, hindering the second element from detecting the detection signal and/or hindering the first element from detecting a response signal from the second element.

In one aspect, if the first element does not detect a response signal from the second element, power-saving initiation module 102 sends a command to power management module 106 to place VoIP terminal device 100 in the power-saving state. For example, a failure to detect the response signal may indicate that the second element (e.g., the user having possession of the second element) is beyond the specified proximity to the first element. However, if the first element detects the response signal, no command is sent to power management module 106 for initiating the power-saving state.

In another aspect, power-saving initiation module 102 determines whether VoIP terminal device is to be placed in the power-saving state based upon a time period beginning when the first element transmits the detection signal and ending when the first element detects the response signal. For instance, user proximity detector 118 may calculate or estimate a distance between the first and second elements based on the time period to enable power-saving initiation module 102 to determine whether VoIP terminal device 100 is to enter the power-saving state. If the distance is greater than a reference distance, power-saving initiation module 102 sends a command to power management module 106 to place VoIP terminal device in the power-saving state. Otherwise, no command is sent to power management module 106 for initiating the power-saving state.

Packet matching module 104 receives packetized communications from a packet-switched data network. The packetized communications can include packets generated in accordance with any of a variety of VoIP signaling protocols, including but not limited to session initiation protocol (SIP), H.323, Media Gateway Control Protocol (MGCP/MEGACO), etc. Each packetized communication includes one or more identification packets and a plurality of content packets. The identification packet(s) identify the communication operation associated with the communication.

For instance, the identification packet(s) may identify the communication as being associated with a telephone call operation, an instant messaging (IM) operation, a short message service (SMS) operation, an email operation, etc. The content packets of the communication include the actual telephone call, instant message, SMS message, email message, etc.

Packet matching module 104 is configured to be operational when VoIP terminal device 100 is in the power-saving state, though other elements of VoIP terminal device 100 may be operated at a relatively low power or turned off. Packet matching module 104 processes identification packet(s) of each incoming communication to determine whether VoIP terminal device 100 is to be woken up to process the content packets of the incoming communication.

Although packet matching module 104 is capable of processing identification packet(s) of an incoming communication while VoIP terminal device 100 is in the power-saving state, VoIP terminal device 100 must be woken up to a relatively higher power state to process the content packets of the incoming communication. In other words, the operating power of at least one element in VoIP terminal device 100 must be increased to provide the necessary functionality to process the content packets of the incoming communication.

For a given VoIP signaling protocol, communications associated with the same communication operation have the same identification packet(s); whereas, communications associated with different communication operations have different identification packet(s). The number of identification packets and/or the number of bytes in each identification packet associated with a particular communication operation may differ between VoIP signaling protocols, however. Thus, packet matching module 104 may include a programmable packet filter 112 to process identification packet(s) in accordance with a specified VoIP signaling protocol. For instance, programmable packet filter 112 may have a variable size and length, which may be set to distinguish among packets generated in accordance with any of a variety of VoIP signaling protocols. The size of programmable packet filter 112 corresponds to the number of bytes that are included in each identification packet, as established by the specified VoIP signaling protocol. The length of programmable packet filter 112 corresponds to the number of identification packet(s) to be processed for each communication.

Packet matching module 104 processes the identification packet(s) of each incoming communication to determine whether the operating power of VoIP terminal device 100 is to be increased to accommodate the additional power necessary to process the content packets of the communication. If packet matching module 104 determines that VoIP terminal device 100 is to be woken up from the power-saving state, packet matching module 104 sends a wake-up command to power management module 106. Otherwise, packet matching module 104 does not send the wake-up command to power management module 106.

If power management module 106 receives a wake-up command from packet matching module 104, power management module 106 wakes up VoIP terminal device 100 from the power-saving state to an extent sufficient to enable processing module 108 to process the content packets of the communication. For instance, power management module 106 may turn on element(s) of VoIP terminal device 100 and/or increase the operating power of element(s) above the operating power utilized in the power-saving state.

Different communication operations may have different power requirements. For example, the different communication operations may require the use of different element(s) of VoIP terminal device 100 and/or different capabilities of the element(s). Thus, power management module 106 may be capable of establishing a plurality of wake-up power levels corresponding to respective communication operations. Power management module 106 may be integrated into general purpose (e.g., pre-existing) power management structure in VoIP terminal device 100 or in structure designated specifically for initiating and waking up VoIP terminal device 100 from the power-saving state.

Storage 110 stores computer software that, when executed by processing module 108, causes processing module 108 to process the content packets of the incoming communication. Processing module 108 may include one or more processors, such as central processing units (CPUs), which are traditionally configured for performing many purposes, and/or digital signal processors (DSPs), which are traditionally designed specifically for digital signal processing. For instance, processing module 108 may include a DSP for processing digitized voice or video signals represented in the packets of an incoming communication.

One method by which a VoIP terminal device may be woken up from a power-saving state will now be described with reference to flowchart 200 of FIG. 2. The steps of flowchart 200 will be described with reference to elements of the example VoIP terminal device 100 shown in FIG. 1 for illustrative purposes. It will be recognized by persons skilled in the relevant art(s) that the steps of flowchart 200 may be performed by any suitable VoIP terminal device. Moreover, the method is described herein by way of example, and it is noted that various other methods may be used to wake up a VoIP terminal device from a power-saving state.

Figure 2:
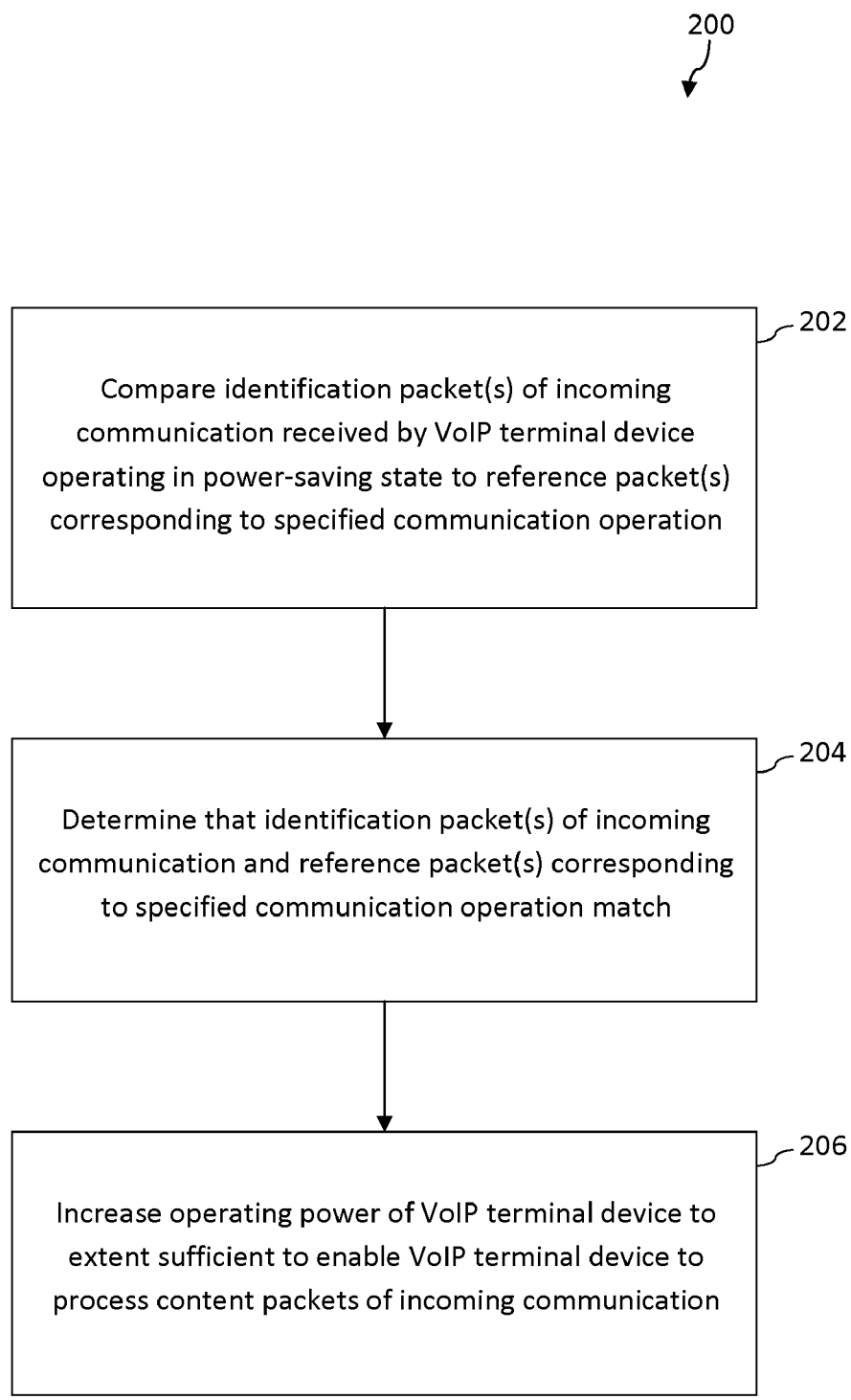
FIG. 2 depicts a flowchart of a method for waking up a VoIP terminal device from a power-saving state in accordance with an example embodiment of the present invention.

As shown in FIG. 2, the method of flowchart 200 begins at step 202 in which packet matching module 104 compares the identification packet(s) of an incoming communication received by VoIP terminal device 100, which is operating in the power-saving state, to reference packet(s) corresponding to a specified communication operation. For instance, packet matching module 104 may include a database that stores reference packet(s) for each communication operation of a VoIP signaling protocol. The reference packet(s) for a communication operation are selected to correspond to the identification packet(s) of communications associated with the communication operation, so that the reference and identification packets may be matched when a communication associated with the specified communication operation is received by VoIP terminal device 100.

At step 204, packet matching module 104 determines that the identification packet(s) of the incoming communication and the reference packet(s) corresponding to the specified communication operation match. For example, packet matching module 104 may require all bytes of the identification packet(s) to match the corresponding bytes of the reference packet(s). In another example, packet matching module 104 may require merely those bytes of the identification packet(s) that are indicative of the communication operation associated with the incoming communication to match the corresponding bytes of the reference packet(s).

At step 206, power management module 106 increases the operating power of VoIP terminal device 100 to an extent sufficient to enable VoIP terminal device 100 to process content packets of the incoming communication. For instance, packet matching module 104 may provide a command to power management module 106 indicating that the operating power of VoIP terminal device 100 is to be increased.

Power management module 106 may increase the operating power of VoIP terminal device 100 in response to receiving the command. For example, the command provided by packet matching module 104 may indicate the extent to which the operating power is to be increased and/or which elements of VoIP terminal device 100 are to be woken up.

In another example, power management module 106 may include a database that cross-references commands with variables indicating the extent to which the operating power of VoIP terminal device 100 is to be increased and/or which elements of VoIP terminal device 100 are to be woken up. Packet matching module 104 may be configured to provide a different wake-up command for each of the respective communication operations supported by the VoIP signaling protocol used to generate the packets of the incoming communication. For instance, each wake-up call may specify a respective operating power for VoIP terminal device 100 or which respective element(s) of VoIP terminal device 100 are to be woken up.

Figure 3:
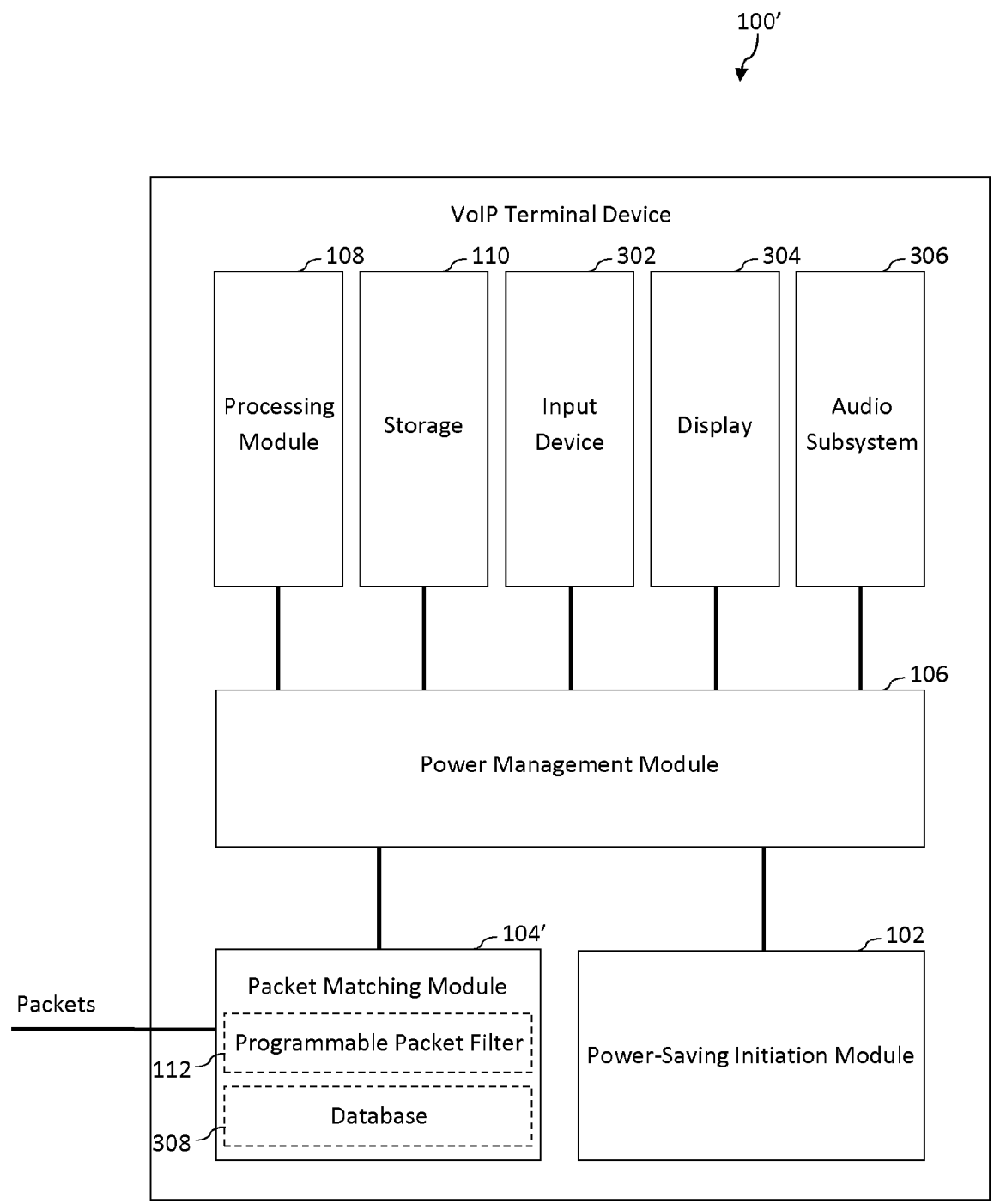

FIG. 3 illustrates that a VoIP terminal device 100' may include other elements in addition to or in lieu of processing module 108 and/or storage 110. As shown in FIG. 3, VoIP terminal device 100' includes input device 302, display 304, and audio subsystem 306 for illustrative purposes. Persons skilled in the relevant art(s) will recognize that VoIP terminal device 100' need not necessarily include elements 302, 304, and 306 and may include other elements.

Input device 302 may be a keyboard, keypad, touchpad, mouse, stylus, or any other device that enables a user to provide information to VoIP terminal device 100'. Display 304 provides a graphical user interface, text-based interface, or other interface to present visual representations of information to the user. Audio subsystem 306 includes components necessary for providing an audio representation of information to the user and for receiving audio information from the user. For example, audio subsystem 306 may include a transducer, speaker, microphone, amplifier, equalizer, or any other component that facilitates production of the audio output and/or reception of the audio input. VoIP terminal device 100' may be a VoIP-enabled computer or a dedicated VoIP telephone or PDA, to provide some examples.

One or more elements (e.g., elements 102, 108, 110, 302, 304, and 306) of VoIP terminal device 100' or some capabilities thereof may be necessary for performing a communication operation associated with an incoming communication received by VoIP terminal device 100'. Thus, packet matching module 104' may provide a command to power management module 106 to enable such element(s) or capabilities. In response to receiving the command, power management module 106 turns on or increases the operating power of any element(s) necessary for enabling VoIP terminal device 100' to perform the communication operation associated with the incoming communication. For example, power management module 106 may turn on a back light of display 302, cause processing module 108 to operate at a greater frequency, etc. in response to receiving the command from packet matching module 104.

Packet matching module 104' is shown to include a database 308 for storing reference packets corresponding to communication operations for each of a plurality of VoIP signaling protocols. Database 308 may further store reference operating power, voltage, or current levels corresponding to the respective communication operations. For instance, a reference operating level may be indicated for each element of VoIP terminal device 100'.

Figure 4:
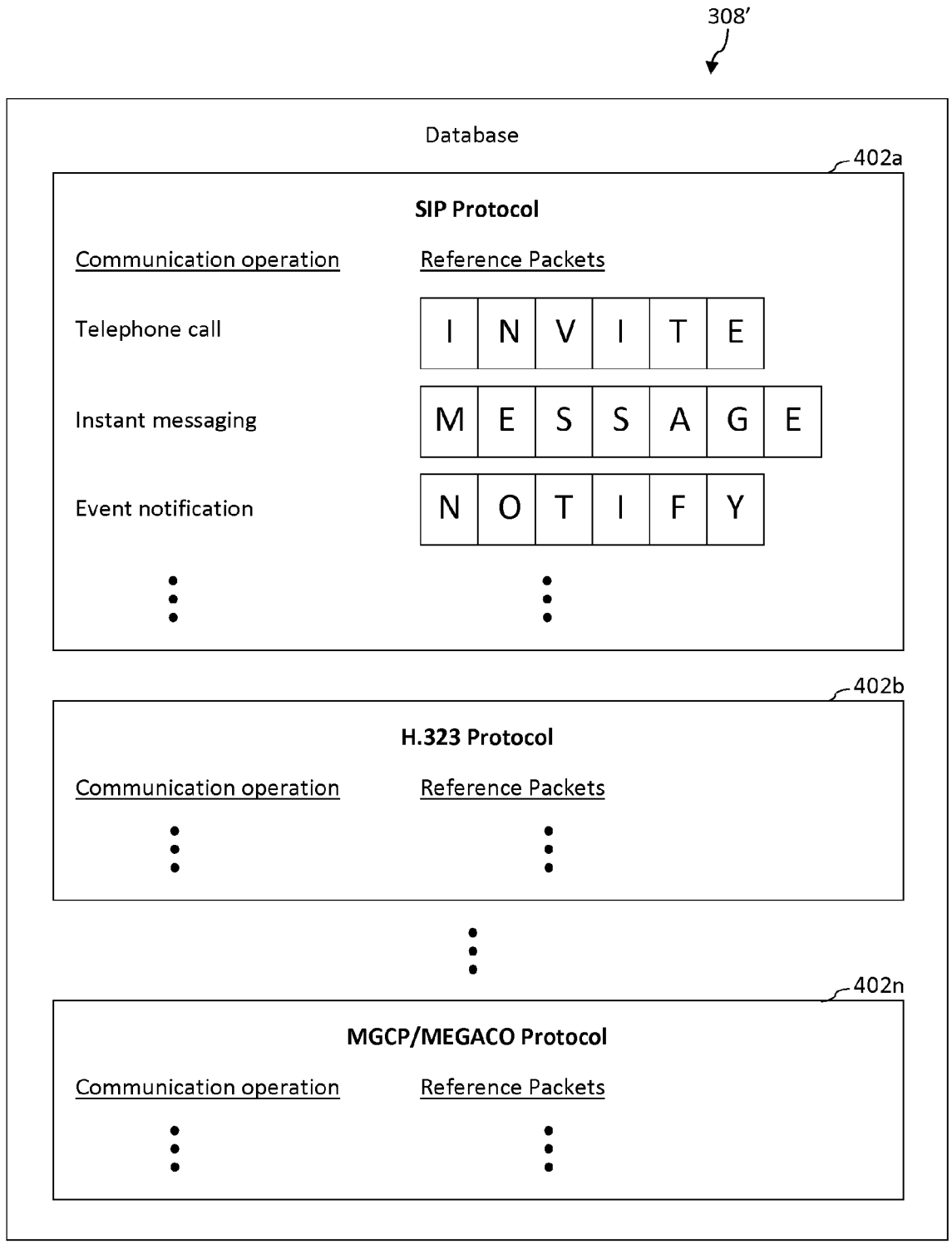
FIG. 4 is an example implementation of a database shown in FIG. 3 according to an embodiment of the present invention.

FIG. 4 shows an example implementation 308' of database 308 shown in FIG. 3 according to an embodiment of the present invention. As shown in FIG. 4, database 308' includes tables 402a-n corresponding to respective VoIP signaling protocols. In particular, table 402a corresponds to the SIP protocol, table 402b corresponds to the H.323 protocol, and table 402n corresponds to the MGCP/MEGACO protocol.

For instance, when programmable packet filter 112 is programmed to process packets that are generated in accordance with the SIP protocol, packet matching module 104' compares the identification packet(s) of incoming communications with the reference packet arrangements in table 402a. When programmable packet filter 112 is programmed to process packets that are generated in accordance with the H.323 protocol, packet matching module 104' compares the identification packet(s) of the incoming communications with the reference packet arrangements in table 402b, and so on.

Database 308' may include any number of tables 402. Moreover, the SIP, H.323, and MGCP/MEGACO protocols are represented in FIG. 4 for illustrative purposes and are not intended to be limiting. Persons skilled in the relevant art(s) will recognize that database 308' may include a table for any suitable VoIP signaling protocol.

Table 402a specifies a reference packet for each of a variety of communication operations in accordance with the SIP protocol. For instance, the telephone call operation is shown to have a reference packet that includes six reference bytes, each corresponding to a respective letter of the word "INVITE". The instant messaging operation is shown to have a reference packet that includes seven reference bytes, each corresponding to a respective letter of the word "MESSAGE". The event notification operation is shown to have a reference packet that includes six bytes, each corresponding to a respective letter of the word "NOTIFY". The event notification operation may be used for any of a variety of purposes. For example, the event notification operation may indicate a state change, such as a change of a peer's presence information (e.g., online, offline, away, etc.) or a change of the user's presence information. In another example, the event notification operation may indicate receipt of a message waiting indication (MWI), indicating receipt of a voice mail message. A single reference packet is shown for each communication operation in FIG. 4 for illustrative purposes, though persons skilled in the relevant art(s) will recognize that a communication operation may correspond to any number of reference packets.

When packet matching module 104' receives an incoming communication, packet matching module 104' compares the identification packet(s) of the incoming communication to the reference packet arrangements in table 402a to determine whether the identification packet(s) match any of the reference packet arrangements. For example, when packet matching module 104' receives an incoming communication associated with a telephone call operation, packet matching module 104' determines that the identification packet of the incoming communication matches the "INVITE" reference packet corresponding to the telephone call operation in table 402a. Packet matching module 104' sends a command to power management module 106 to increase the operating power of VoIP terminal device 100' to an extent sufficient to enable VoIP terminal device 100' to process the content packets of the incoming communication. For instance, power management module 106 may turn on input device 302 and audio subsystem 306 of VoIP terminal device 100', but leave display 304 turned off, in response to receiving the command from packet matching module 104'. Power management module 100' may increase the frequency at which processing module 108 operates to accommodate processing associated with the telephone call operation.

In this example, if table 402a includes reference operating power, voltage, or current level(s) corresponding to the telephone call operation, the command that packet matching module 104' sends to power management module 106 for waking up VoIP terminal device 100' may include information regarding the reference level(s). For instance, packet matching module 104' may indicate an absolute or incremental reference power, voltage, or current level for each element of VoIP terminal device 100' or for only some elements (e.g., those elements that are necessary for processing the content packets of the incoming communication).

A user may not want VoIP terminal device 100' to wake up for all communication operations listed in tables 402. Thus, tables 402 may include an indicator for each communication operation, indicating whether VoIP terminal device 100' is to be woken up from the power-saving state regardless whether the identification packet(s) of an incoming communication matches the reference packet(s) associated with the communication operation.

Figure 5:
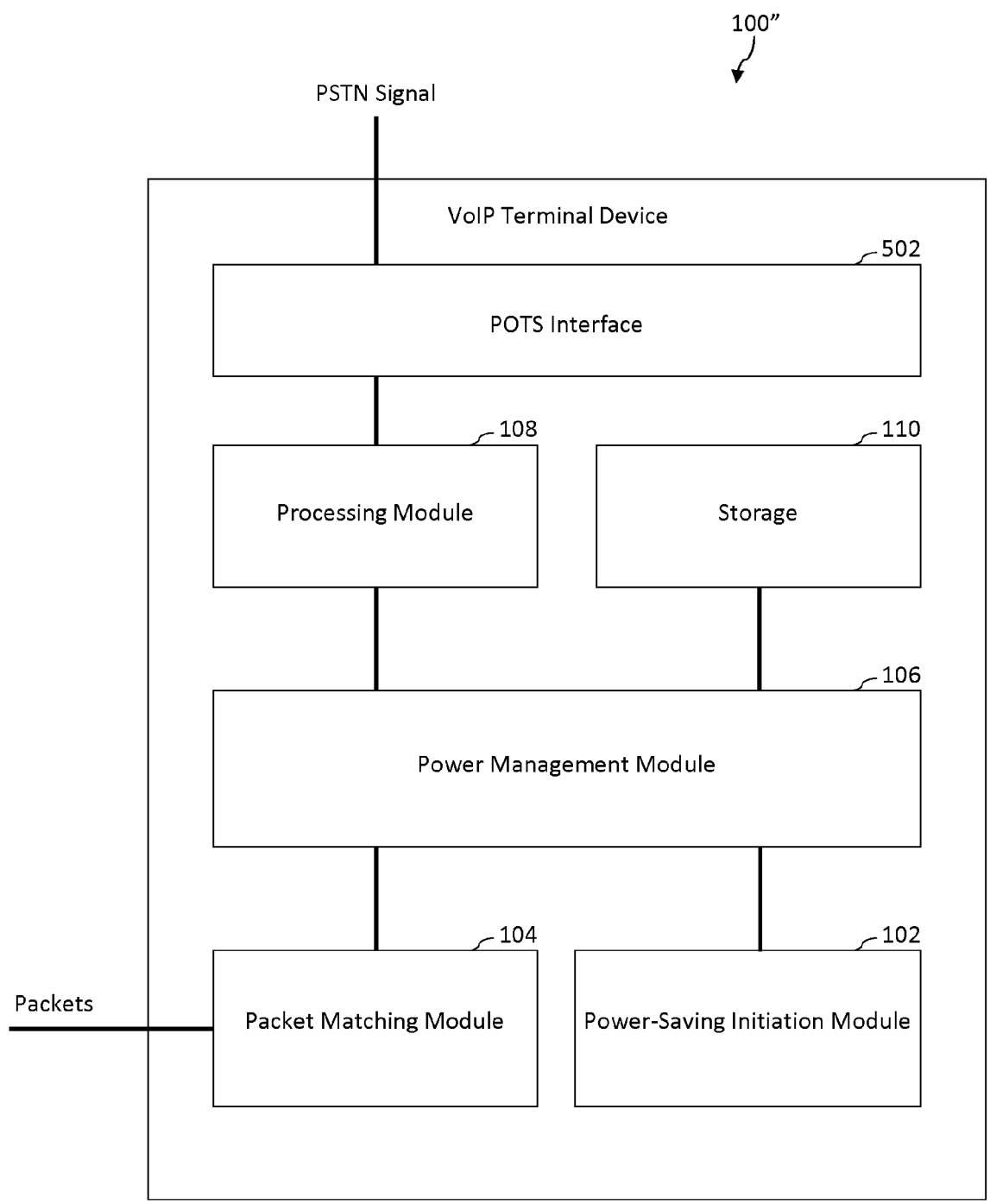

FIG. 5 shows a VoIP terminal device 100" configured as a VoIP adapter according to an embodiment of the present invention. As shown in FIG. 5, VoIP terminal device 100" includes a plain old telephone service (POTS) interface 502 that enables communication between a POTS telephone and other VoIP terminal devices in a packet-switched network. For example, the POTS telephone may generate a public switched telephone network (PSTN) signal, which POTS interface 502 converts to packets for transmission via the packet-switched network. In another example, POTS interface 502 converts packets received from the packet-switched network to a PSTN signal, which the POTS telephone is capable of processing. Although only a single POTS interface 502 is shown in FIG. 5, it is to be understood that VoIP terminal device 100" may include any number of POTS interfaces.

Power management module 106 may be configured to turn off or reduce the operating power of POTS interface 502 in response to receiving a command from power-saving initiation module 102 to enter the power-saving state. Power management module 106 may be configured to turn on or increase the operating power of POTS interface 502 in response to receiving a command from packet matching module 104 to wake up VoIP terminal device 100" from the power-saving state.

The embodiments described herein provide a variety of benefits as compared to conventional VoIP terminal devices. One such benefit is the conservation of energy. For example, embodiments enable a VoIP terminal device to enter a power-saving state when not performing a communication operation. The VoIP terminal device may decide to enter the power-saving state based on a user action, inactivity, user proximity, etc. The operating power of the VoIP terminal device in the power-saving state may be relatively low yet sufficient to meet the power requirements for keeping essential elements (e.g., a CPU, RAM, etc.) operational to achieve minimal energy consumption. For example, if packet matching module 104 is implemented in software, it may be necessary to maintain the operating power of the CPU at a level sufficient to allow the CPU to execute the software of packet matching module 104 when the VoIP terminal device is in the power-saving state. If packet matching module 104 is implemented in hardware, however, it is possible to turn the CPU off in the power-saving state, though substantial time may be required to turn on the CPU when the VoIP terminal device wakes up from the power-saving state.

Embodiments enable a VoIP terminal device to receive packets while in the power-saving state. For example, the VoIP terminal device is capable of processing signaling messages (e.g., identification packets) of an incoming communication. The VoIP terminal device is programmable to enable processing of the signaling messages based on the VoIP signaling protocol being used. The VoIP terminal device is capable of waking up from the power-saving state based on the call signaling messages. For instance, the VoIP terminal device may be configured to wake up in response to determining that packet(s) of the call signaling messages (e.g., identification packet(s)) match reference packet(s).

Embodiments may directly or indirectly benefit the environment. Embodiments may reduce the operation cost and/or extend the battery life of VoIP terminal devices. Embodiments may be configured to operate in accordance with a power over Ethernet (PoE) technique, eliminating the need for a power supply line separate from the data line, which is used for receipt and transmission of packets.

The power-saving and wake up techniques described herein are applicable to any suitable VoIP telecommunications device, such as personal computer (PC) soft phones, 3G or 4G and later mobile telephones and personal digital assistants (PDAs) having VoIP communication capabilities, etc.

III. Example Computer System Implementation

Figure 6:
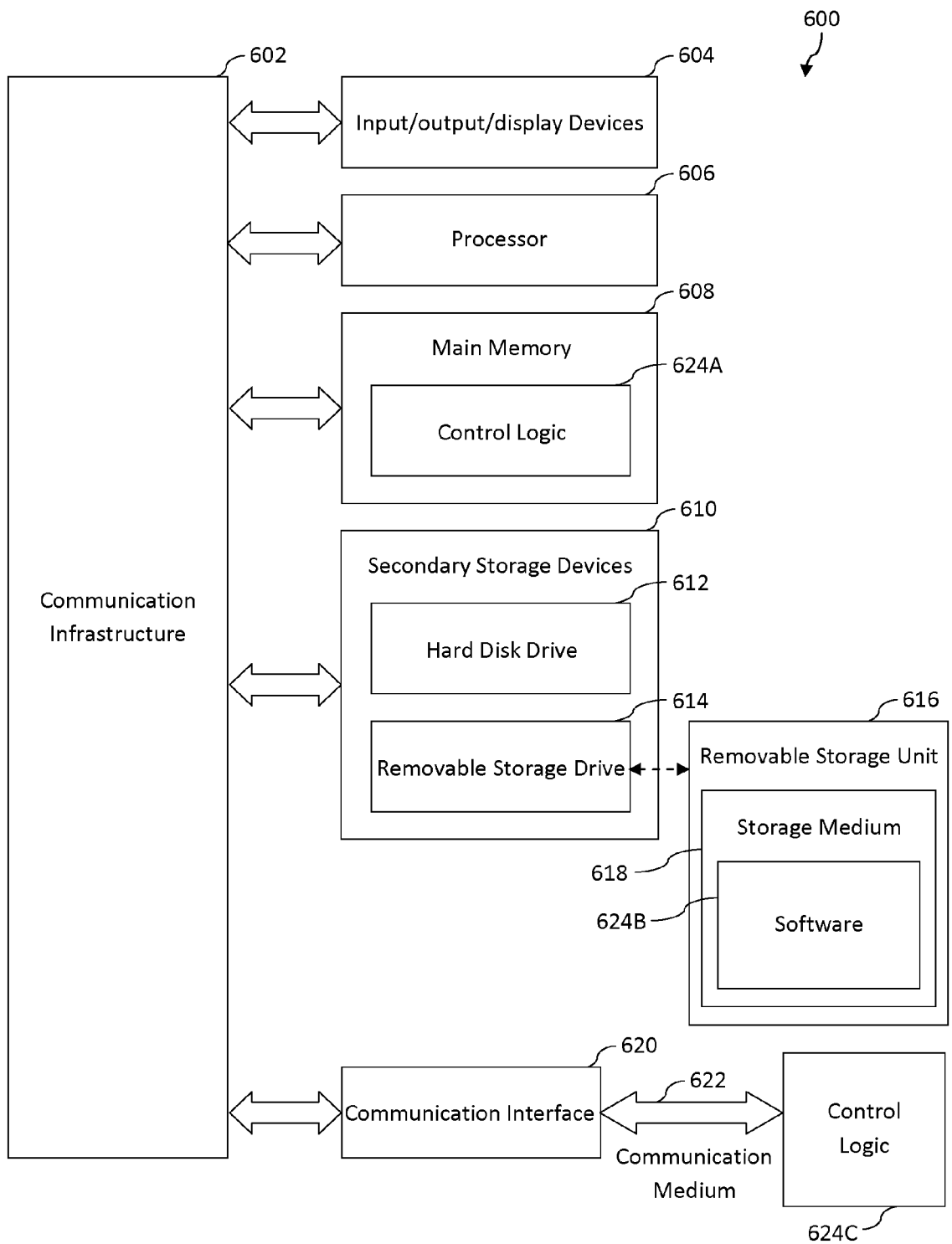
FIG. 6 is a block diagram of an example computer system that may be used to implement one or more aspects of the present invention.

The embodiments described herein, including systems, methods/processes, and/or apparatuses, may be implemented using well known computers, such as computer 600 shown in FIG. 6. For example, VoIP terminal device 100, including power-saving initiation module 102, packet matching module 104, and power management module 106, all depicted in FIGS. 1, 3, and 5, and the steps of flowchart 200 depicted in FIG. 2, can each be implemented using one or more computers 600.

Computer 600 can be any commercially available and well known computer capable of performing the functions described herein, such as computers available from International Business Machines, Apple, Sun, HP, Dell, Cray, etc. Computer 600 may be any type of computer, including a desktop computer, a laptop computer, etc.

As shown in FIG. 6, computer 600 includes one or more processors (e.g., central processing units (CPUs) or digital signal processors (DSPs)), such as processor 606. Processor 606 may include power-saving initiation module 102, packet matching module 104, power management module 106, and/or processing module 108, all of which are depicted in FIGS. 1, 3, and 5, or any portion or combination thereof, for example, though the scope of the present invention is not limited in this respect. Processor 606 is connected to a communication infrastructure 602, which may include, for example, a communication bus. In some embodiments, processor 606 can simultaneously operate multiple computing threads.

Computer 600 also includes a primary or main memory 608, such as a random access memory (RAM). Main memory has stored therein control logic 624A (computer software), and data.

Computer 600 also includes one or more secondary storage devices 610. Secondary storage devices 610 include, for example, a hard disk drive 612 and/or a removable storage device or drive 614, as well as other types of storage devices, such as memory cards and memory sticks. For instance, computer 600 may include an industry standard interface, such as a universal serial bus (USB) interface for interfacing with devices such as a memory stick. Removable storage drive 614 represents a floppy disk drive, a magnetic tape drive, a compact disk drive, an optical storage device, tape backup, etc.

Removable storage drive 614 interacts with a removable storage unit 616. Removable storage unit 616 includes a computer useable or readable storage medium 618 having stored therein computer software 624B (control logic) and/or data. Removable storage unit 616 represents a floppy disk, magnetic tape, compact disc (CD), digital versatile disc (DVD), Blue-ray disc, optical storage disk, memory stick, memory card, or any other computer data storage device. Removable storage drive 614 reads from and/or writes to removable storage unit 616 in a well known manner.

It will be apparent to persons skilled in the relevant art(s) that storage 110 of FIGS. 1, 3, and 5 and/or database 308 of FIGS. 3 and 4 may be included in main memory 608, secondary memory 610, removable storage unit 616, or some combination thereof, though the scope of the present invention is not limited in this respect.

Computer 600 also includes input/output/display devices 604, such as monitors, keyboards, pointing devices, etc. For example, input/output/display devices 604 may include input device 302, display 304, and/or audio subsystem 306.

Computer 600 further includes a communication or network interface 620. Communication interface 620 enables computer 600 to communicate with remote devices. For example, communication interface 620 allows computer 600 to communicate over communication networks or mediums 622 (representing a form of a computer useable or readable medium), such as local area networks (LANs), wide area networks (WANs), the Internet, etc. Network interface 620 may interface with remote sites or networks via wired or wireless connections. Examples of communication interface 622 include but are not limited to a modem, a network interface card (e.g., an Ethernet card), a communication port, a Personal Computer Memory Card International Association (PCMCIA) card, etc.

Control logic 624C may be transmitted to and from computer 600 via the communication medium 622.

Any apparatus or manufacture comprising a computer useable or readable medium having control logic (software) stored therein is referred to herein as a computer program product or program storage device. This includes, but is not limited to, computer 600, main memory 608, secondary storage devices 610, and removable storage unit 616. Such computer program products, having control logic stored therein that, when executed by one or more data processing devices, cause such data processing devices to operate as described herein, represent embodiments of the invention.

The invention may be embodied in software, hardware, and/or firmware implementations other than those described herein. Any software, hardware, and firmware implementations suitable for performing the functions described herein can be used.

IV. Conclusion

While various embodiments of the present invention have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method of waking up a Voice over Internet Protocol (VoIP) terminal device from a power-saving state, the method comprising:
    comparing at least one identification packet of an incoming communication received by the VoIP terminal device operating in the power-saving state to a plurality of reference packets, the plurality of reference packets corresponding to a plurality of respective specified communication operations;
    determining whether the at least one identification packet matches at least one of the plurality of reference packets; and
    increasing an operating power of the VoIP terminal device to a designated extent that is sufficient to enable the VoIP terminal device to process content packets of the incoming communication, the designated extent being a first extent if the at least one identification packet matches a first reference packet of the plurality of reference packets, the designated extent being a second extent if the at least one identification packet matches a second reference packet of the plurality of reference packets, the second extent being different from the first extent, the second reference packet being different from the first reference packet.

2. The method of claim 1, wherein comparing the at least one identification packet to the plurality of reference packets includes comparing the at least one identification packet to at least one reference packet corresponding to a telephone call operation.

3. The method of claim 1, wherein comparing the at least one identification packet to the plurality of reference packets includes comparing the at least one identification packet to at least one reference packet corresponding to an instant messaging operation.

4. The method of claim 1, wherein comparing the at least one identification packet to the plurality of reference packets includes comparing the at least one identification packet to at least one reference packet corresponding to an event notification operation.

5. The method of claim 1, wherein comparing the at least one identification packet to the plurality of reference packets includes comparing the at least one identification packet to at least one reference packet corresponding to an email operation.

6. The method of claim 1, wherein increasing the operating power of the VoIP terminal device includes selectively increasing operating powers of respective elements of the VoIP terminal device based on a specified communication operation corresponding to a reference packet of the plurality of reference packets that matches the at least one identification packet.

7. The method of claim 1, wherein increasing the operating power of the VoIP terminal device includes increasing operating powers of respective elements of the VoIP terminal device to respective levels indicative of a specified communication operation corresponding to a reference packet of the plurality of reference packets that matches the at least one identification packet.

8. The method of claim 1, further comprising:
converting the content packets of the incoming communication to a public switched telephone network signal.

9. The method of claim 1, further comprising:
distinguishing between identification packets of a plurality of respective VoIP signaling protocols to determine that the at least one identification packet of the incoming communication is to be compared to the plurality of reference packets corresponding to the plurality of respective specified communication operations.

10. The method of claim 1, further comprising:
placing the VoIP terminal device in the power-saving state in response to detecting a press of a button on the VoIP terminal device or a change in physical configuration of the VoIP terminal device.

11. The method of claim 1, further comprising:
placing the VoIP terminal device in the power-saving state in response to detecting inactivity of the VoIP terminal device for specified period of time.

12. The method of claim 1, further comprising:
placing the VoIP terminal device in the power-saving state in response to detecting that a user is beyond a specified proximity to the VoIP terminal device.

13. A computer program product comprising a computer-readable medium having computer program logic recorded thereon for enabling a processor-based system to wake up a VoIP terminal device, comprising:
a first program logic module for enabling the processor-based system to compare at least one identification packet of an incoming communication received by the VoIP terminal device operating in the power-saving state to a plurality of reference packets, the plurality of reference packets corresponding to a plurality of respective specified communication operations to determine whether the at least one identification packet matches at least one of the plurality of reference packets; and
a second program logic module for enabling the processor-based system to increase an operating power of the VoIP terminal device to a designated extent that is sufficient to enable the VoIP terminal device to process content packets of the incoming communication, the designated extent being a first extent if the at least one identification packet matches a first reference packet of the plurality of reference packets, the designated extent being a second extent if the at least one identification packet matches a second reference packet of the plurality of reference packets, the second extent being different from the first extent, the second reference packet being different from the first reference packet.

14. The computer program product of claim 13, further comprising:
a third program logic module for enabling the processor-based system to convert the content packets of the incoming communication to a public switched telephone network signal.

15. The computer program product of claim 13, further comprising:
a third program logic module for enabling the processor-based system to distinguish between identification packets of a plurality of respective VoIP signaling protocols to determine that the at least one identification packet of the incoming communication is to be compared to the plurality of reference packets corresponding to the plurality of respective specified communication operations.

16. A VoIP terminal device comprising:
a packet matching module configured to compare at least one identification packet of an incoming communication received by the VoIP terminal device operating in a power-saving state to a plurality of reference packets, the plurality of reference packets corresponding to a plurality of respective specified communication operations to determine whether the at least one identification packet matches at least one of the plurality of reference packets; and
a power management module configured to increase an operating power of the VoIP terminal device to a designated extent that is sufficient to enable the VoIP terminal device to process content packets of the incoming communication, the designated extent being a first extent if the at least one identification packet matches a first reference packet of the plurality of reference packets, the designated extent being a second extent if the at least one identification packet matches a second reference packet of the plurality of reference packets the second extent being different from the first extent, the second reference packet being different from the first reference packet.

17. The device of claim 16, wherein the plurality of respective specified communication operations includes a telephone call operation, an instant messaging operation, an event notification operation, or an email operation.

18. The device of claim 16, further comprising:
a plurality of elements coupled to the power management module,
wherein the power management module is configured to selectively increase operating powers of the respective elements based on a specified communication operation in response to the at least one identification packet matching at least one of the plurality of reference packets corresponding to the specified communication operation.

19. The device of claim 16, further comprising:
a plurality of elements coupled to the power management module,
wherein the power management module is configured to increase operating powers of the respective elements to respective levels indicative of a specified communication operation in response to the at least one identification packet matching at least one of the plurality of reference packets corresponding to the specified communication operation.

20. The device of claim 16, further comprising:
a plain old telephone system interface to convert the content packets of the incoming communication to a public switched telephone network signal.

21. The device of claim 16, further comprising:
a power-saving initiation module configured to determine when the VoIP terminal device is to enter the power-saving state.

22. The device of claim 21, wherein the power-saving initiation module includes at least one of a user action detector, an inactivity detector, or a user proximity detector.

23. The device of claim 16, wherein the packet matching module includes a programmable packet filter configurable to process identification packets corresponding to respective VoIP signaling protocols of a plurality of VoIP signaling protocols.

24. The device of claim 16, wherein the device is a dedicated VoIP telephone or personal digital assistant.

25. The device of claim 16, wherein the incoming communication is a session initiation protocol communication.

* * * * *

UNITED STATES PATENT AND TRADEMARK OFFICE
CERTIFICATE OF CORRECTION

PATENT NO.        : 8,331,274 B2
APPLICATION NO.   : 12/352014
DATED             : December 11, 2012
INVENTOR(S)       : Tommy Wing Chau Kee It is certified that error appears in the above-identified patent and that said Letters Patent is hereby corrected as shown below:

In column 14, line 51, in claim 16, delete "packets" and insert -- packets, -- therefor.

Signed and Sealed this
Nineteenth Day of March, 2013

Teresa Stanek Rea
*Acting Director of the United States Patent and Trademark Office*